(12) United States Patent
Matsuzaki et al.

(10) Patent No.: US 7,303,714 B2
(45) Date of Patent: Dec. 4, 2007

(54) CROSS MEMBER AND MANUFACTURING METHOD THEREOF

(75) Inventors: Tsutomu Matsuzaki, Sano (JP);
Takashi Funatsu, Tatebayashi (JP);
Kazuhiro Saito, Saitama (JP); Seiji Sanada, Saitama (JP); Hideki Yoshida, Ashikaga (JP); Yo Matsutani, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/697,638

(22) Filed: Oct. 31, 2003

(65) Prior Publication Data

US 2004/0135400 A1 Jul. 15, 2004

(30) Foreign Application Priority Data

Nov. 1, 2002 (JP) .............................. 2002-319809
Dec. 19, 2002 (JP) .............................. 2002-368060

(51) Int. Cl.
*B29C 45/14* (2006.01)
(52) U.S. Cl. .................. 264/275; 264/259; 264/328.12
(58) Field of Classification Search ................ 264/259, 264/328.1, 275
See application file for complete search history.

(56) References Cited

U.S. PATENT DOCUMENTS 6,019,928 A * 2/2000 Fujitani et al. ............. 264/263
6,093,358 A * 7/2000 Schiewe et al. ............ 264/250
6,214,266 B1 * 4/2001 Millif et al. ................ 264/129
6,231,940 B1 * 5/2001 Aichner et al. ............ 428/36.2
6,468,458 B1 * 10/2002 Anderson et al. .......... 264/246
6,568,707 B2 * 5/2003 Hier et al. .................. 280/732
6,858,276 B1 * 2/2005 Chomier et al. .......... 428/35.7
2002/0153750 A1 10/2002 Feith et al.

FOREIGN PATENT DOCUMENTS

| EP | 0 492 129 B1 | 7/1992 |
| EP | 1 329 302 A1 | 7/2003 |
| JP | 5-016260 A | 1/1993 |
| JP | 6-122158 A | 5/1994 |
| JP | 6-270189 A | 9/1994 |
| JP | 7-237242 A | 9/1995 |
| JP | 8-282333 A | 10/1996 |
| JP | 2000-220598 A | 8/2000 |
| JP | 3219407 B2 | 10/2001 |
| WO | WO 01/70558 A1 | 9/2001 |

* cited by examiner

*Primary Examiner*—Monica A Huson
(74) *Attorney, Agent, or Firm*—Foley & Lardner LLP

(57) ABSTRACT

A cross member is arranged so as to extend in a width direction of a vehicle body. The cross member has both ends fixed to side framework structures of the vehicle body. The cross member includes a base frame extending in the width direction and reinforcing frame parts formed in integral with the base frame to cover the circumference of the base frame within its limited ranges in the width direction of the vehicle body. The base frame and the reinforcing frame parts are made from the same resinous material or plural resinous materials belonging to engineering plastic system.

14 Claims, 17 Drawing Sheets

CROSS MEMBER AND MANUFACTURING METHOD THEREOF

BACKGROUND OF THE INVENTION

1. Field of the Invention

The present invention relates to a cross member arranged as a framework structure in the width direction of a vehicle and a manufacturing method for the cross member.

2. Description of Related Art

A cross member, which is arranged on the backside of an instrument panel so as to extend in the width direction of the vehicle, has both ends fixed to side framework structures of the vehicle. The cross member performs a role as a framework structure in the width direction of the vehicle and another role as a supporting member for various components, for example, instrument panel, column shaft, air bag, etc. Japanese Patent Application Laid-open (heisei) No. 8-282333 discloses this kind of cross member which is shown in FIGS. 1 and 2.

In FIGS. 1 and 2, the cross member 50 includes a main frame 51 extending in the width direction of the vehicle and a pair of brackets 52 fixed to appropriate parts (e.g. both ends) of the main frame 51, in one body. The main frame 51 is made of fiber reinforced thermosetting resin, while the brackets 52 are made of fiber reinforced thermoplastic resin. The main frame 51 includes a frame body 51a having a hollow part 53 defined therein, an inner layer 51b arranged inside of the body 51 and an outer layer 51c arranged outside of the body 51. The frame body 51a is made of fiber reinforced thermosetting resin. The inside and outside layers 51b, 51c are made of fiber reinforced thermoplastic resin, which is similar to that of the bracket 52. That is, in the prior art, since the cross member 50 is made from resinous material and the hollow part 53 of the main frame 51 is used as air-conditioning duct, there have been accomplished weight saving, reduction in number of components, cost saving, reduction in number of assembling steps, space saving, etc.

In the above-mentioned cross member 50, however, it cannot afford sufficient strength to the member's part that is required to have high strength in comparison with the other parts. For example, in case of the cross member 50 arranged on the backside of an instrument panel, the member's part supporting a column shaft is required to have high strength particularly.

Additionally, since the main frame 51 and the brackets 52 are formed by different kinds of resinous materials, a problem of deteriorated recycling efficiency arises.

Meanwhile, the conventional cross member has been provided by injecting molten resin to the circumference of a main frame (see publications of Japanese Patent Application Laid-open No. 2000-220598 and Japanese Patent No. 3219407). However, it is noted that the cross member made by these molding methods does not always exhibit high strength. Additionally, there is the possibility of torsion and flexure in the cross member.

SUMMARY

In the above situation, it is an object of the present invention to provide a cross member having high strength in the member's part where high strength is required and also having superior recycling efficiency and a manufacturing method of such a cross member.

Further, it is another object of the present invention to provide a cross member having high torsion rigidity, high flexure rigidity and great strength in all and a manufacturing method of such a cross member.

According to a first embodiment of the present invention, the above-mentioned object is accomplished by a cross member arranged so as to extend in a width direction of a vehicle body, having both ends connected to side framework structures of the vehicle body, the cross member comprising: a base frame extending in the width direction; and reinforcing frame parts formed in integral with the base frame to cover the circumference of the base frame within limited ranges thereof in the width direction of the vehicle body, wherein the base frame and the reinforcing frame parts are made from a same resinous material or plural resinous materials belonging to a same material system.

According to the first embodiment, as the cross member's parts (i.e., the base frame covered with the reinforcing frame parts) have respective double layer structures each comprising the base frame and each of the reinforcing frame parts, these cross member's parts can be provided with high strength in comparison with the other parts of the cross member. Additionally, if it is required to break up the so-completed cross member for recycling, it is possible to break up the cross member by a common recycling process, as the base frame and the reinforcing frame parts are made from resinous materials belonging to the same material system. Consequently, it is possible to provide the cross member's parts that are required to have high strength, with high strength. Additionally, the so-completed cross member is superior in recycling efficiency.

According to a second embodiment of the present invention, there is also provided a manufacturing method of a cross member that is arranged so as to extend in a width direction of a vehicle body, having both ends fixed to side framework structures of the vehicle body, the method comprising: forming a base frame extending in the width direction of the vehicle body by means of resinous molding; and insert-molding the base frame, within limited ranges thereof in the width direction of the vehicle body, with resinous material belonging to the same material system as material of the base frame, thereby forming reinforcing frame parts in integral with the base frame.

According to the second embodiment, as the cross member's parts (i.e., the base frame covered with the reinforcing frame parts) have respective double layer structures each comprising the base frame and each of the reinforcing frame parts, these cross member's parts can be provided with high strength in comparison with the other parts of the cross member. Additionally, if it is required to break up the so-completed cross member for recycling, it is possible to break up the cross member by a common recycling process since the base frame and the reinforcing frame parts are made from resinous materials belonging to the same material system. Consequently, it is possible to provide the cross member's parts that are required to have high strength, with high strength. Additionally, the so-completed cross member is superior in recycling efficiency.

These and other objects and features of the present invention will become more fully apparent from the following description and appended claims taken in conjunction with the accompany drawings.

DETAILED DESCRIPTION OF THE PREFERRED EMBODIMENT

Referring to accompanying drawings showing the details of a cross member and its manufacturing method, embodiments of the present invention will be described below.

1st. Embodiment

Figure 1:
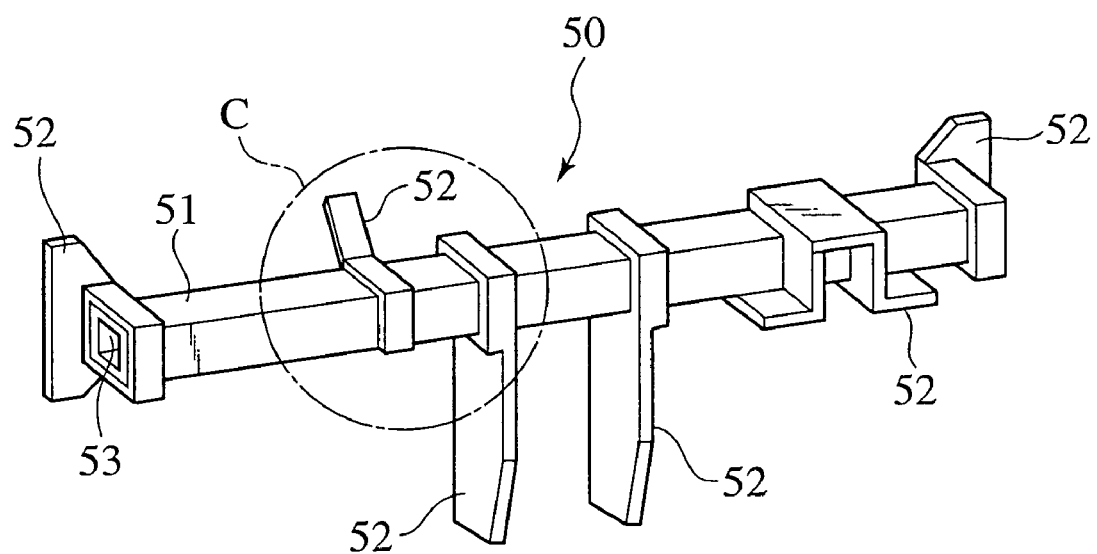
FIG. 1 is a perspective view of a cross member in prior art.
Figure 2:
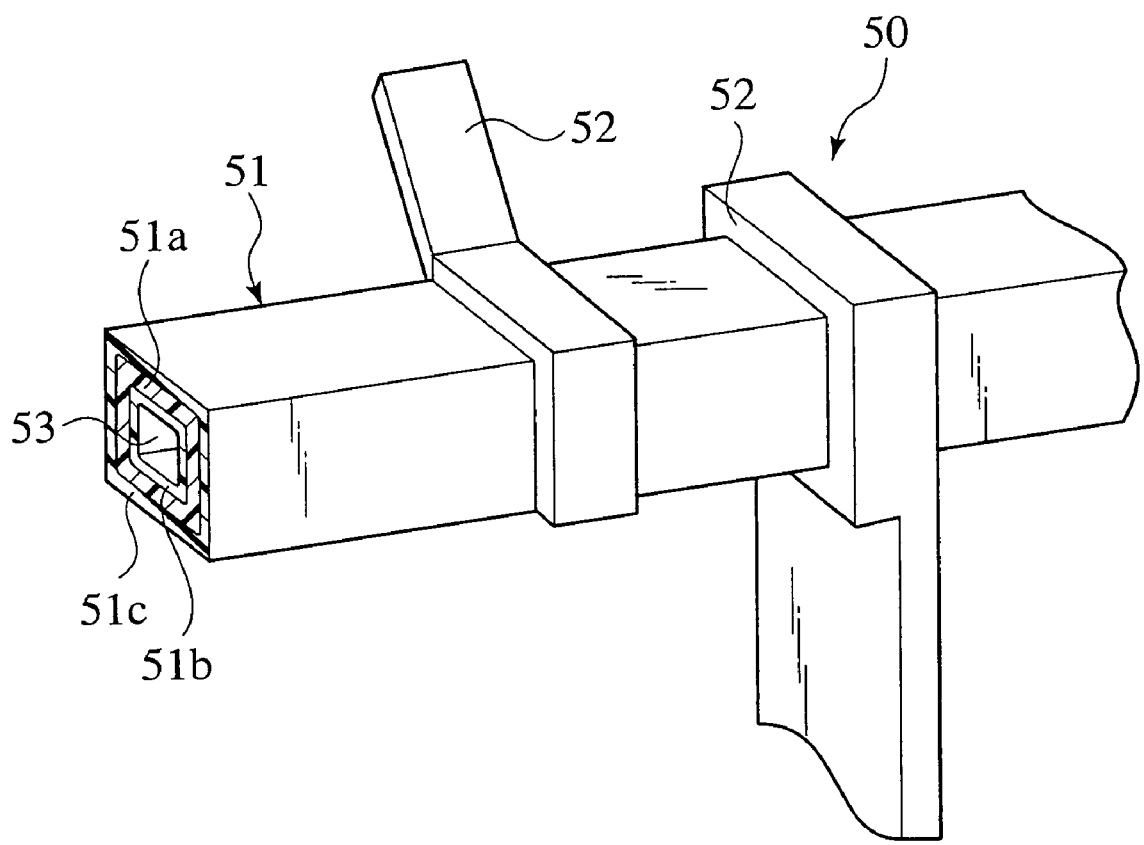
FIG. 2 is an enlarged view of part C of FIG. 1.
Figure 3:
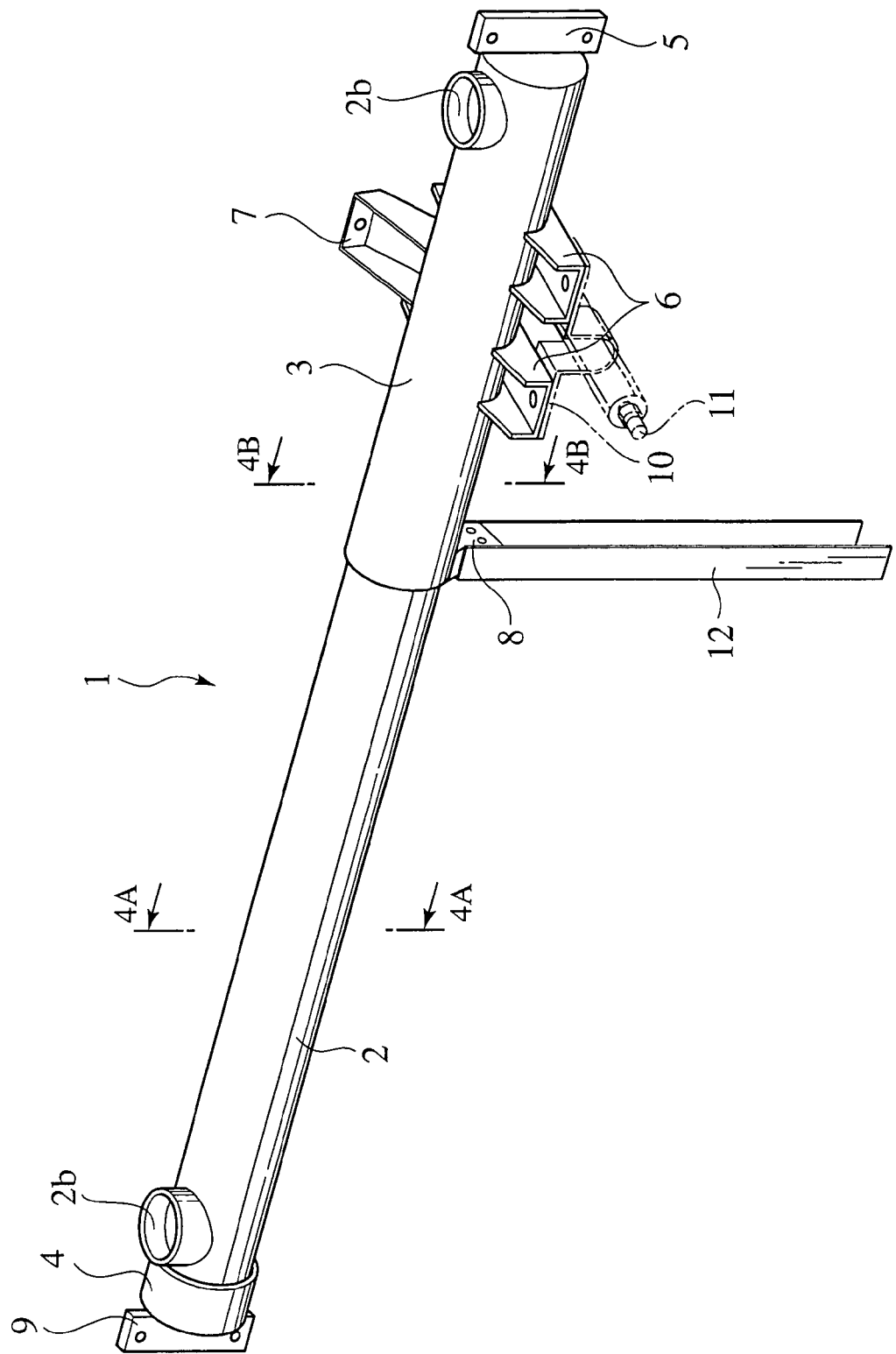
FIG. 3 is a perspective view of a cross member in accordance with a first embodiment of the present invention.
Figure 4A:
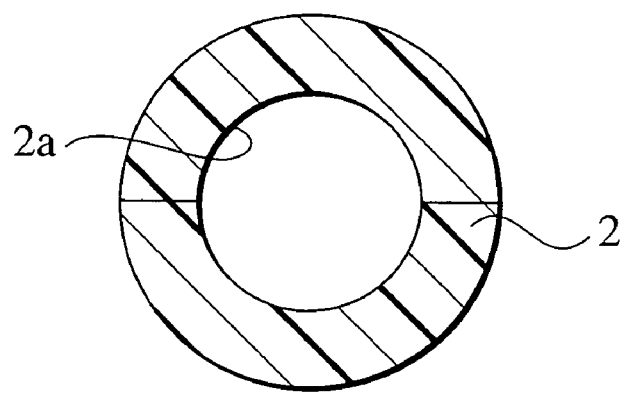
FIG. 4A is a sectional view taken along a line 4A-4A of FIG. 3
Figure 4B:
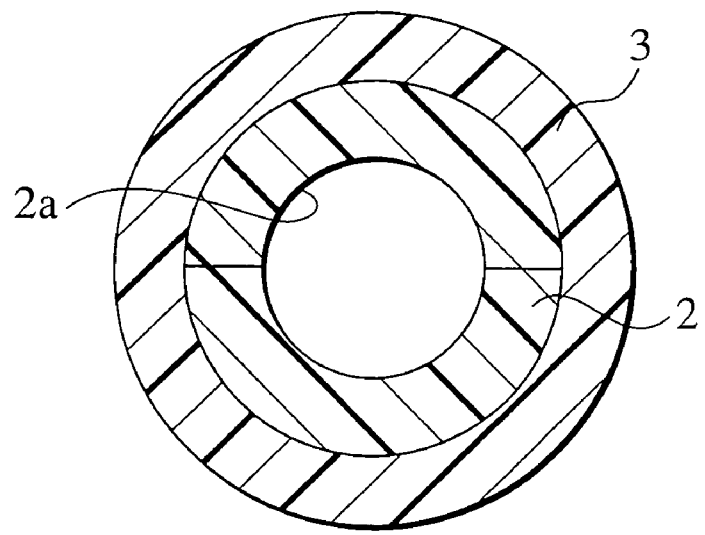
FIG. 4B is a sectional view taken along a line 4B-4B of FIG. 3.

As shown in FIGS. 3 and 4, a cross member 1 includes a base frame 2, a first reinforcing frame part 3 and a second reinforcing frame part 4 all formed in one body. The base frame 2 is arranged on the backside of an instrument panel (not shown) of a vehicle so as to extend in the width direction of the vehicle. Within a range of a driver's seat in the width direction of the base frame 2, the first reinforcing frame part 3 is arranged so as to cover the circumference of the base frame 2. On the opposite side of the first reinforcing frame part 3, the second reinforcing frame part 4 is arranged so as to cover the circumference of the base frame 2 at its end.

The base frame 2 has a cylindrical shape to have a hollow part 2a inside. The base frame 2 is provided, on both sides thereof, with openings 2b, 2b communicating with the hollow part 2a. As the openings 2b, 2b are respectively connected with a duct pipe (not shown), the hollow part 2a constitutes part of an air-conditioning duct (not shown). At a substantial intermediate position of the base frame 2 in the width direction of the vehicle, a duck bracket and a component-attachment bracket (both not shown) are arranged to fix the air-conditioning duct.

The first reinforcing frame part 3 is provided with a side bracket part 5, a column-shaft bracket part 6, a body-fastening bracket part 7, a support bracket part 8, etc. in one body. The side bracket part 5 is arranged on one end of the first reinforcing frame part 3 and further fixed to one side framework structure (not shown) on one side of the vehicle. A column shaft 11 is fixed to the column-shaft bracket part 6 through a mating bracket 10. A body frame (not shown) or the like is fixed to the body-fastening bracket part 7. The support bracket part 8 is arranged on the other end of the first reinforcing frame part 3 and further fixed to an instrument stay 12 (as the support member) through its upper end. The lower end of the instrument stay 12 is fixed to a body structure of the vehicle, so that the first reinforcing frame part 3 is fixed, on both sides thereof, to the vehicle body.

On the other hand, the second reinforcing frame part 4 is provided, on its one side, with a side bracket part 9 only. The side bracket part 9 is fixed to another side framework structure (not shown) on the other side of the vehicle.

With the above-mentioned constitution, the cross member 1 is fixed, at both ends thereof, to the side framework structures of the vehicle body and also fixed, at the center part, to the vehicle body through the instrument stay 12.

The materials of the base frame 2 and the first and second reinforcing frame parts 3, 4 will be described below. The base frame 2 and the first and second reinforcing frame parts 3, 4 are made from the same engineering plastic material or plural engineering plastic materials that are resinous materials belonging to the same material system. In detail, the base frame 2 is formed by an engineering plastic material containing glass fiber of 15 to 50% content, of which elasticity is more than 10 GPa at absolute dry and 5 GPa at wet. For example, the base frame 2 may be formed of polypropylene (PP), nylon 6 (PA6), nylon 66 (PA66), aromatic nylon (aromatic PA), polybutylene terephthalate (PBT), polyphenylene oxide (PPO), polyphenylene sulphide (PPS), liquid crystal polyester (LCP), polyimide (PI), sheet molding compound (SMC), polyester or alloys of some of these materials. Moreover, the reinforcing material (filling material), may be formed of glass fiber, talc, carbon fiber, Kevlar fiber, ceramic fiber, metal fiber (stainless steel etc.), natural fiber (chaff, coconut husk, kenaf, etc.) or combinations of these compounds.

The first and second reinforcing frame parts 3, 4 are formed of an engineering plastic material containing glass fiber of 30% or more content, of which elasticity is more than 25 GPa at absolute dry and 20 GPa at wet. That is, the first and second reinforcing frame parts 3, 4 are made from a material of high rigidity in comparison with the base frame 2. For example, the first and second reinforcing frame parts 3, 4 may be made of polypropylene (PP), nylon 6 (PA6), nylon 66 (PA66), aromatic nylon (aromatic PA), polybutylene terephthalate (PBT), polyphenylene oxide (PPO), polyphenylene sulphide (PPS), liquid crystal polyester (LCP), polyimide (PI), sheet molding compound (SMC), polyester or alloys of some of these materials. Moreover, a reinforcing material (filling material), may be formed of the glass fiber, talc, carbon fiber, Kevlar fiber, ceramic fiber, metal fiber (stainless steel etc.), natural fiber (chaff, coconut husk, kenaf, etc.) or combinations of these compounds.

Alternatively, although possibly reducing mutual adhesiveness and recycling efficiency, the base frame 2 and the first and second reinforcing frame parts 3, 4 may be formed of base polymers belonging to the same material system.

According to this embodiment, it is possible to construct the member's parts of the reinforcing frame parts 3, 4 with remarkable high strength. Thus, as the first reinforcing frame part 3 is arranged on the driver's seat side (where it is required to fix the column shaft), it is possible to provide a steering support member with high rigidity in spite of the cross member 1 being made of resin. Additionally, it is possible to form the side bracket part 5 with high rigidity. As both ends of the reinforcing frame parts 3, 4 are fixed to the framework structures of the vehicle body, it is possible to improve the strength of the cross member 1 itself. Particularly, the fixing forces of the reinforcing frame parts 3, 4 to the vehicle body are increased to allow in-vehicle parts supported by the parts 3, 4 to be attached to the vehicle body strongly.

Figure 5:
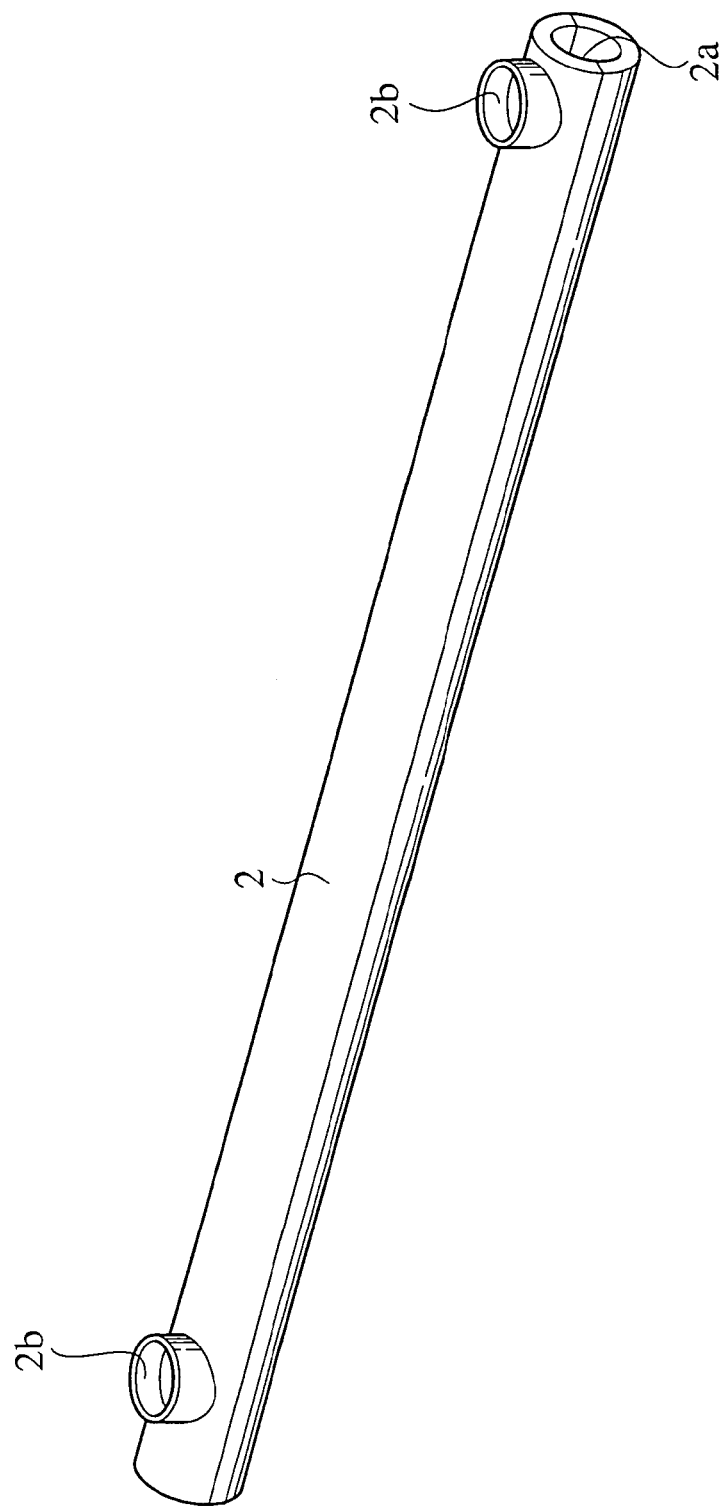
FIG. 5 is a perspective view of a base frame to explain the manufacturing process of the cross member of the embodiment of the present invention.
Figure 6:
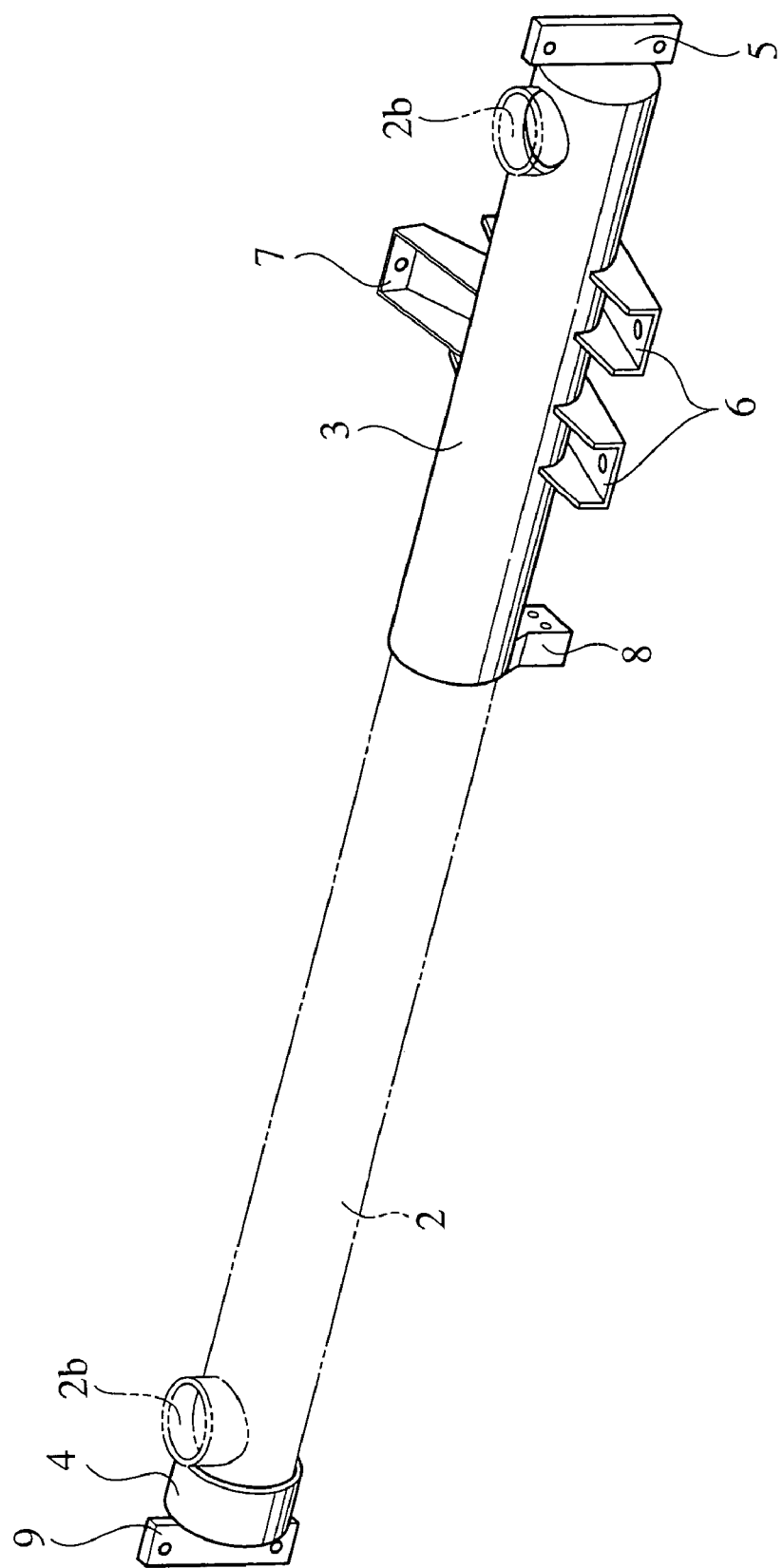
FIG. 6 is a perspective view of first and second reinforcing frame parts to explain the manufacturing process of the cross member of the embodiment of the present invention.

The cross member 1 is manufactured as follows. First, as shown in FIG. 5, the base frame 2 is formed in separation by injection molding and welded each other, for example by oscillation welding or ultrasonic wave welding.

Next, the first and second reinforcing frame parts 3, 4 are formed by injection molding while inserting the base frame 1 into a molding die. That is, the cross member 1 is produced by injection-molding the first and second reinforcing frame parts 3, 4 onto the base frame 2.

In the cross member 1 produced by the above-mentioned manufacturing method, since the member's parts covered with the first and second reinforcing frame parts 3, 4 have double layer structures comprising the base frame 2 and the frame parts 3, 4, it is possible for the member's parts to have high strength in comparison with the other parts of the member 1. Particularly, since the cross member 1 is provided, on the driver's seat side, with the double layer structure by the reinforcing frame part 3 with the column shaft bracket 6, the arrangement allows the cross member 1 to be supported by the column shaft 11 etc. strongly. When taking the cross member 1 into pieces for recycling, a common recycling process is applicable for its dissolution since the base frame 2 and the first and second reinforcing frame parts 3, 4 are made from resinous materials belonging to the same material system. In this way, the cross member 1 can be constructed so that the member's parts requiring having high strength are formed with high strength. Furthermore, the cross member 1 is superior in recycling efficiency.

According to the above embodiment, since the hollow part 2a of the base frame 2 is utilized as an air-conditioning duct, it can be produced while reducing the number of components and the number of assembling steps. Alternatively, the hollow part 2a of the base frame 2 may be used as a wiring space for wire harness.

As the first and second reinforcing frame parts 3, 4 of the above embodiment are formed by high-rigidity materials (in comparison with the base frame 2) the reinforcing parts 3, 4 can be constructed with remarkable high strength. Accordingly, it is possible to support the column shaft 11 etc. certainly.

Noted that, in the above-mentioned embodiment, the base frame 2 and the first and second reinforcing frame parts 3, 4 are together formed by the engineering plastic materials. Nevertheless, so long as they are resinous materials belonging to the same material system, of course, the base frame 2 and the first and second reinforcing frame parts 3, 4 may be formed by the other materials.

Furthermore, according to the above-mentioned embodiment, since the first and second reinforcing frame parts 3, 4 are arranged on both sides of the base frame 2 and also provided with the side bracket parts 5, 9 fixed to the side framework structures (not shown) of the vehicle body, the arrangement allows the side bracket parts 5, 9 to be produced with high strength, thereby strengthening the fixing of the side framework structure.

Also noted that since the first reinforcing frame part 3 is provided, on the other end, with the support bracket part 8 fixing the instrument stay 12, it is possible to fix both ends of the first reinforcing frame part 3 to the framework structures (not shown) of the vehicle body. Therefore, the strength of the cross member 1 itself, particularly, the fixing force of the reinforcing frame part 3 to the vehicle body can be increased to allow the in-vehicle components (e.g. the column shaft 11) supported by the reinforcing frame part 3 to be attached to the vehicle body strongly.

Since the base frame 2 of this embodiment is formed in separation by injection molding, it is possible to manufacture even a base frame having a complicated configuration with ease. Besides the separative injection molding, the base frame 2 may be produced by the other forming method, for example, extrusion, blow molding, lost-core, etc.

In the abovementioned embodiment, the first and second reinforcing frame parts 3, 4 are produced in the general injection molding in which a part of the base frame 2 is inserted in a molding die and melt material is compressed into the closed molding die. The first and second reinforcing frame parts 3, 4 can be also produced by injection compressive molding or injection press molding and the like, in which melt material is injected into a molding die having a slight clearance, then compressive force is applied to the melt material. With this type of injection molding, the first and second reinforcing frame parts 3, 4 can be molded without applying a large injection force to the base frame 2.

In the above embodiment, the cross member 1 is an element arranged on the backside of the instrument panel (not shown) of the vehicle body and also arranged in the width direction of the vehicle. In the modification, the present invention is also applicable to one which is arranged in a position except the above position and of which part is required to have high strength.

Particularly, according to the above-mentioned embodiment, it is possible to manufacture a base frame of complicated configuration with ease. Additionally, it is possible to form the reinforcing frame parts by injection molding without applying great injection pressure on the inserted base frame, whereby the reinforcing frame parts can be constructed with remarkable high strength.

2nd. Embodiment

Figure 7:
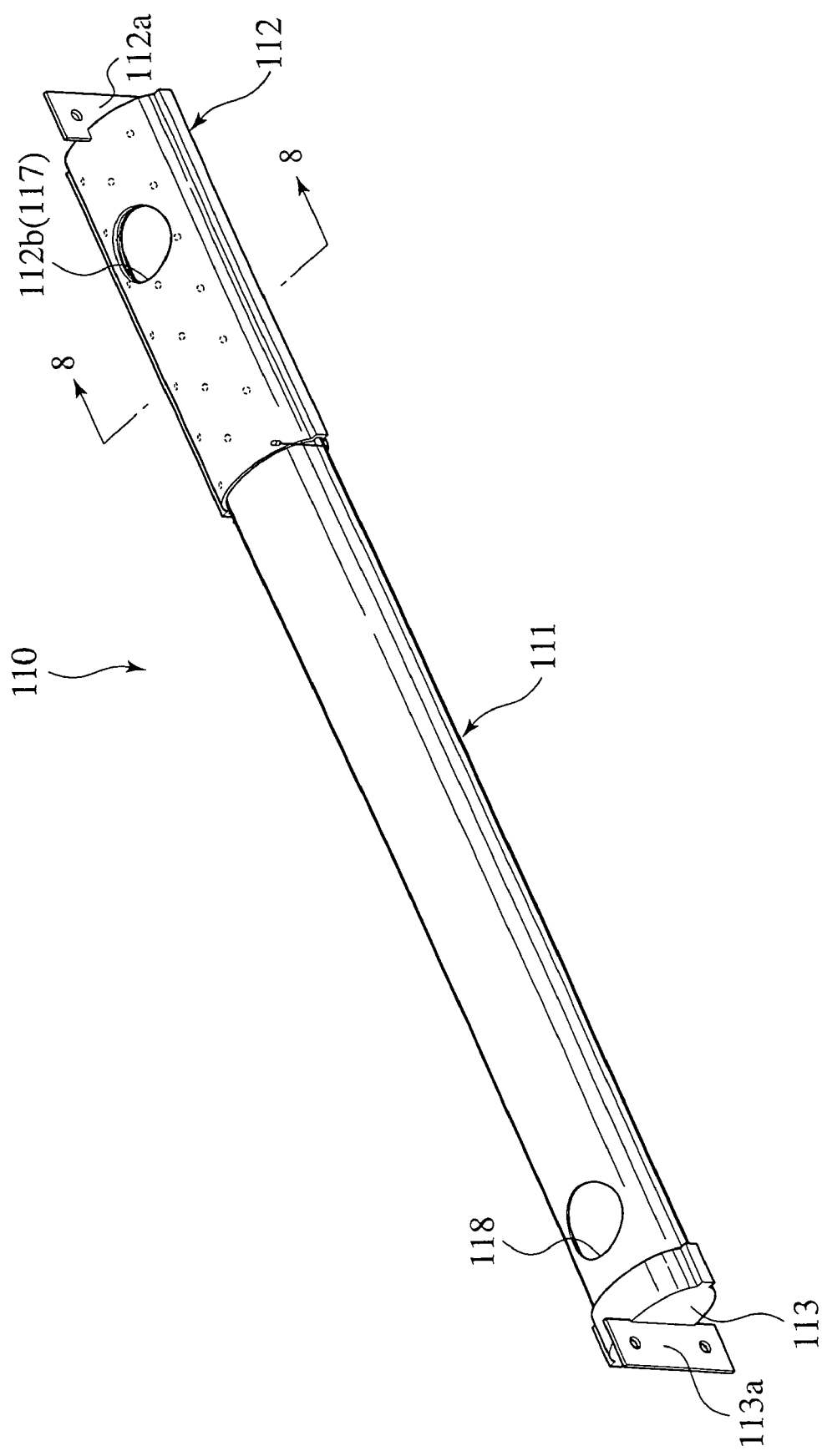
FIG. 7 is a perspective view showing a cross member in accordance with a second embodiment of the present invention.
Figure 8:
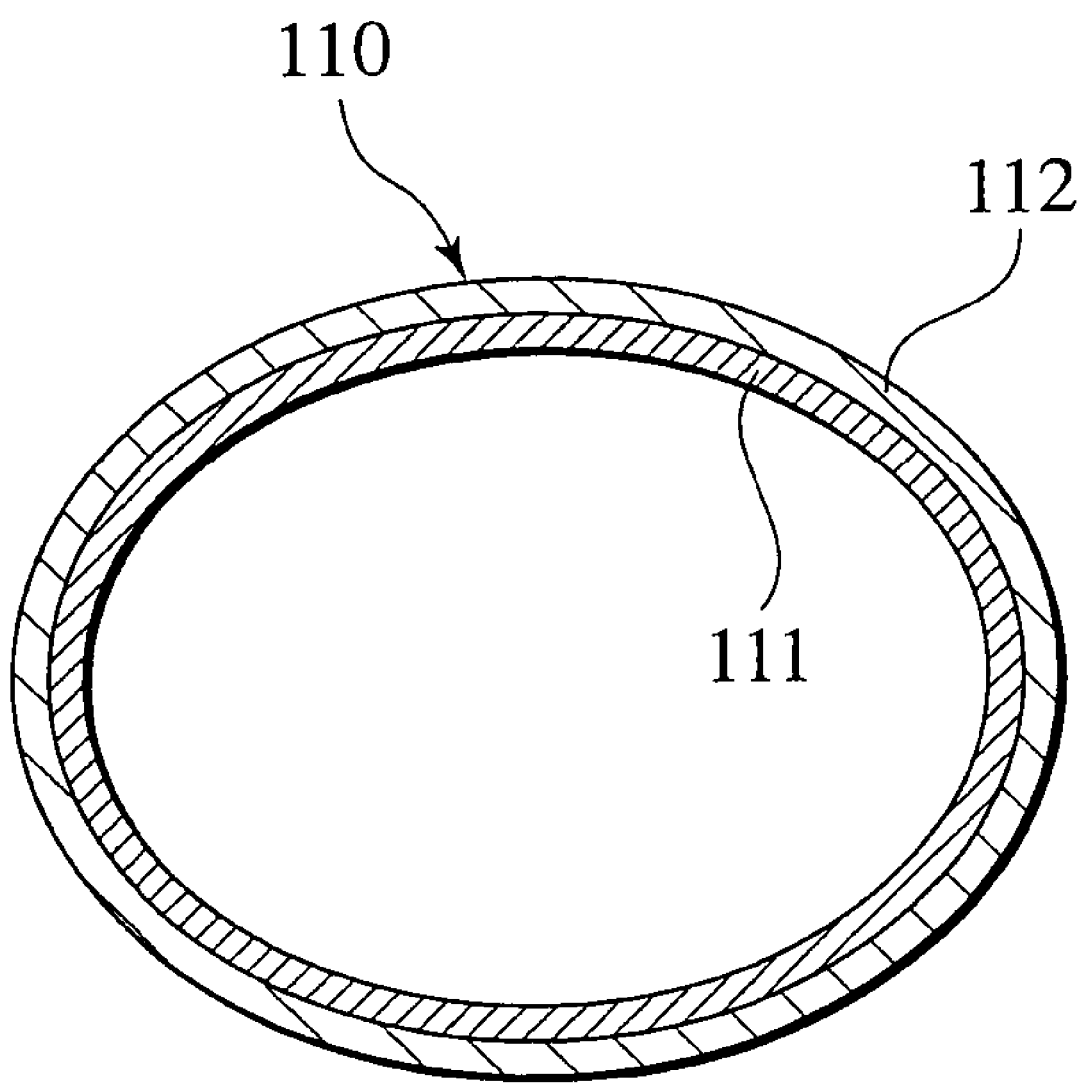
FIG. 8 is a sectional view taken along a line 8-8 of FIG. 7.

As shown in FIG. 7, a cross member 110 of the second embodiment is formed by, in detail, a steering member that is arranged between the lower parts of front pillars in front of a vehicle cabin to extent in the width direction of the vehicle, for supporting the steering column and the instrument panel. The cross member 110 includes a base frame 111 spreading over the whole width of the vehicle cabin in the width direction of the vehicle and a reinforcing frame part 112 that reinforces the base frame's part extending from the lower part of the front pillar (driver's seat side) to the vicinity of the steering column to support the steering column. As shown in FIG. 8, which is a sectional view taken along a line 8-8 of FIG. 7, both of the base frame 111 and the reinforcing frame part 112 are shaped to have oval sections. In arrangement, the base frame 111 is inserted inside the reinforcing frame part 112 to mutual fixation.

Figure 9:
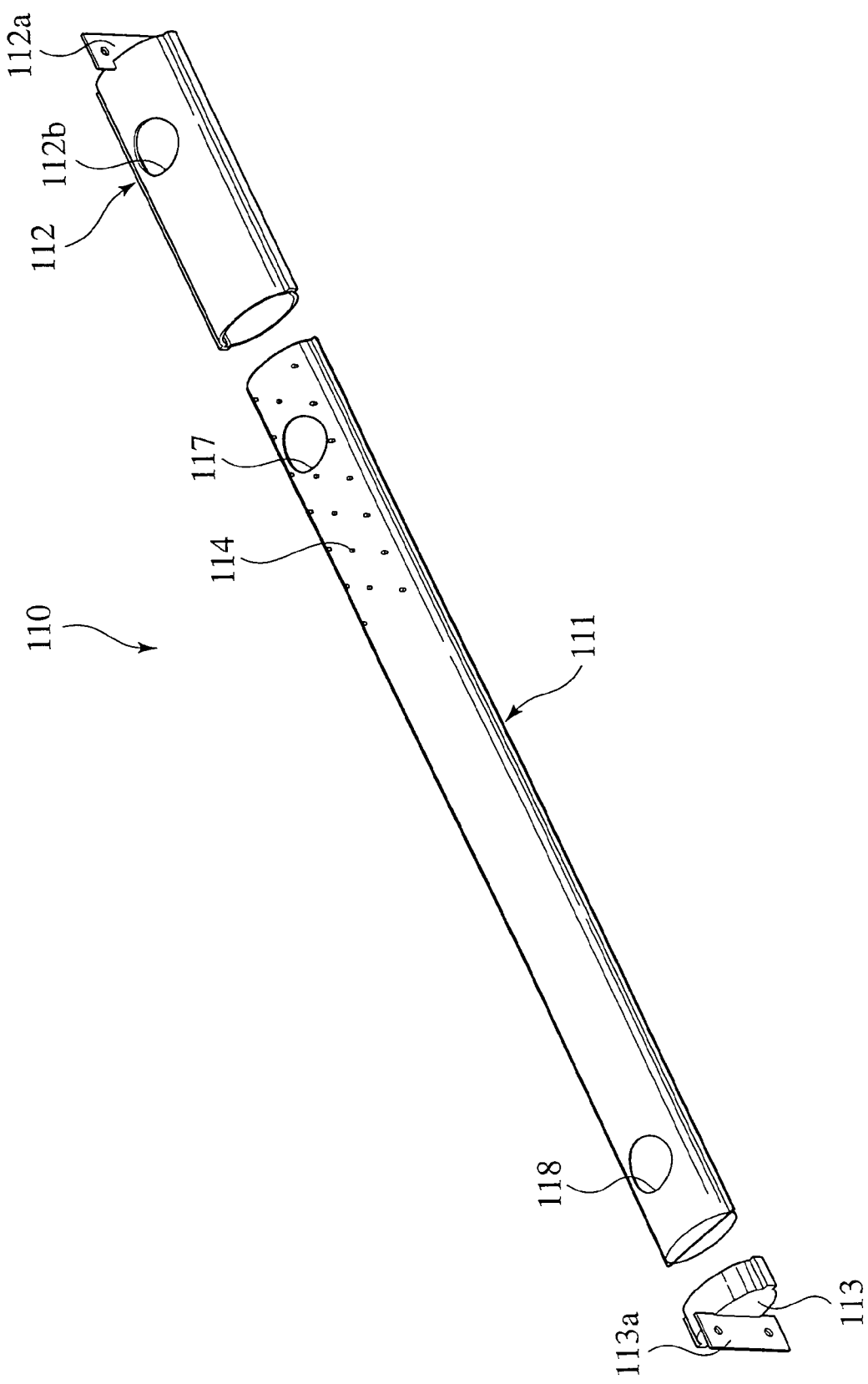
FIG. 9 is a perspective view of the cross member of FIG. 7 in its exploded condition.

As shown in FIG. 9, the cross member 110 comprises a lid member 113 on the left side, the above base frame 111 and the reinforcing frame part 112. The reinforcing frame part 112 is joined to the base frame 111 so as not to detach the former from the latter; nevertheless FIG. 9 shows the base frame 111 being separated from the reinforcing frame part 112 for the sake of explanation. For the function of a duct member of an air conditioner (not shown), the base frame 111 is hollow-shaped and connected to the air conditioner in the vicinity of the intermediate position in the width direction. In this view, the base frame 111 is provided, on both sides thereof, with holes 117, 118 for blowing out air into the vehicle cabin. Similarly, the reinforcing frame part 112 is also provided with a hole 112b for overlapping the hole 117 of the base frame 111. The lid member 113 has an attachment part 113a formed to be fixed to the lower part of the front pillar on the passenner's side.

Figure 10:
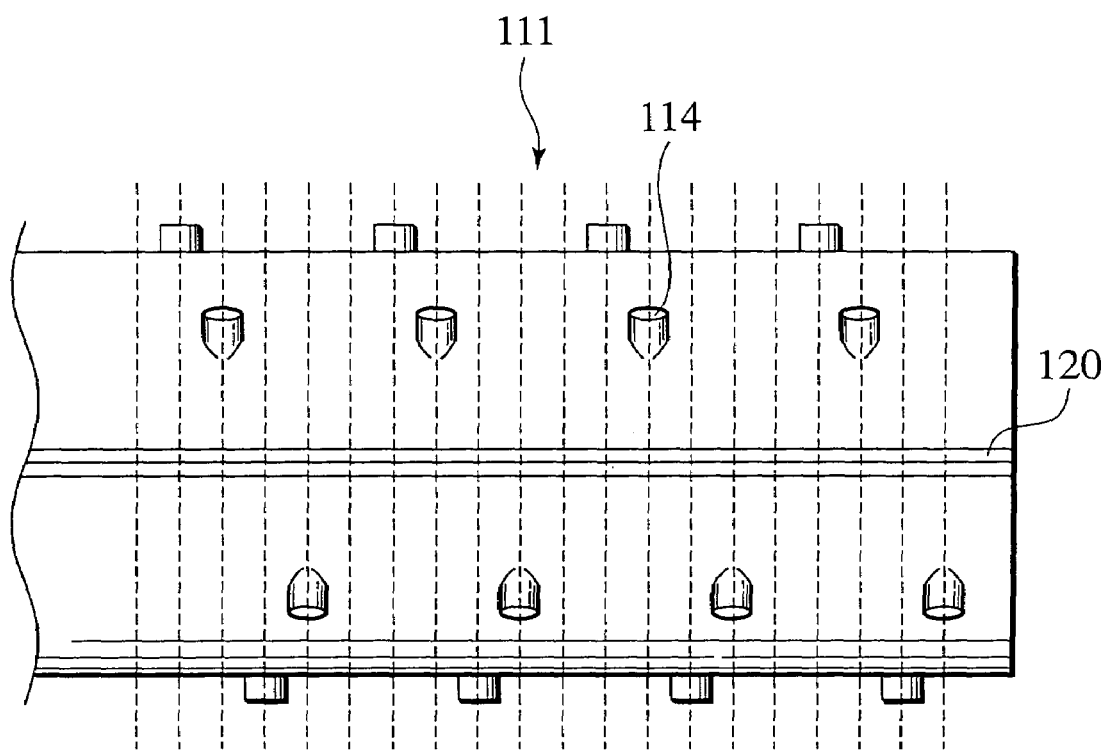
FIG. 10 is a side view showing an end of the base frame.
Figure 12:
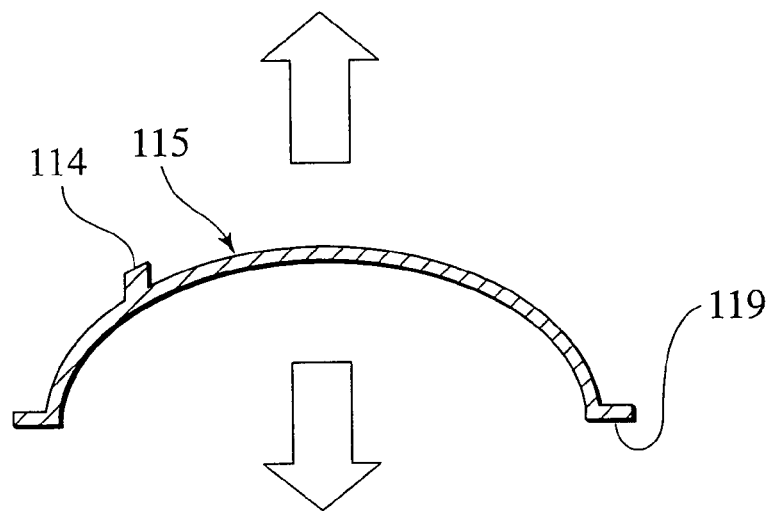
FIG. 12 is a sectional view taken along a line 12-12 of FIG. 11.

In FIG. 9, the base frame 111 has a plurality of bosses 114 formed to project from the outer surface of the frame's part to be covered with the reinforcing frame part 112. Each of the bosses 114 is shaped to be a general column. Further, as representatively shown in FIG. 12, the bosses 114 (only one shown) are formed so as to extend in the vertical direction in view of facilitating removal of molding dies after molding. As shown in FIG. 10, the bosses 114 are arranged in different positions in the axial direction of the base frame 111. In other words, only one boss 114 is present in each of radial cross sections shown with broken lines in the figure.

Figure 11:
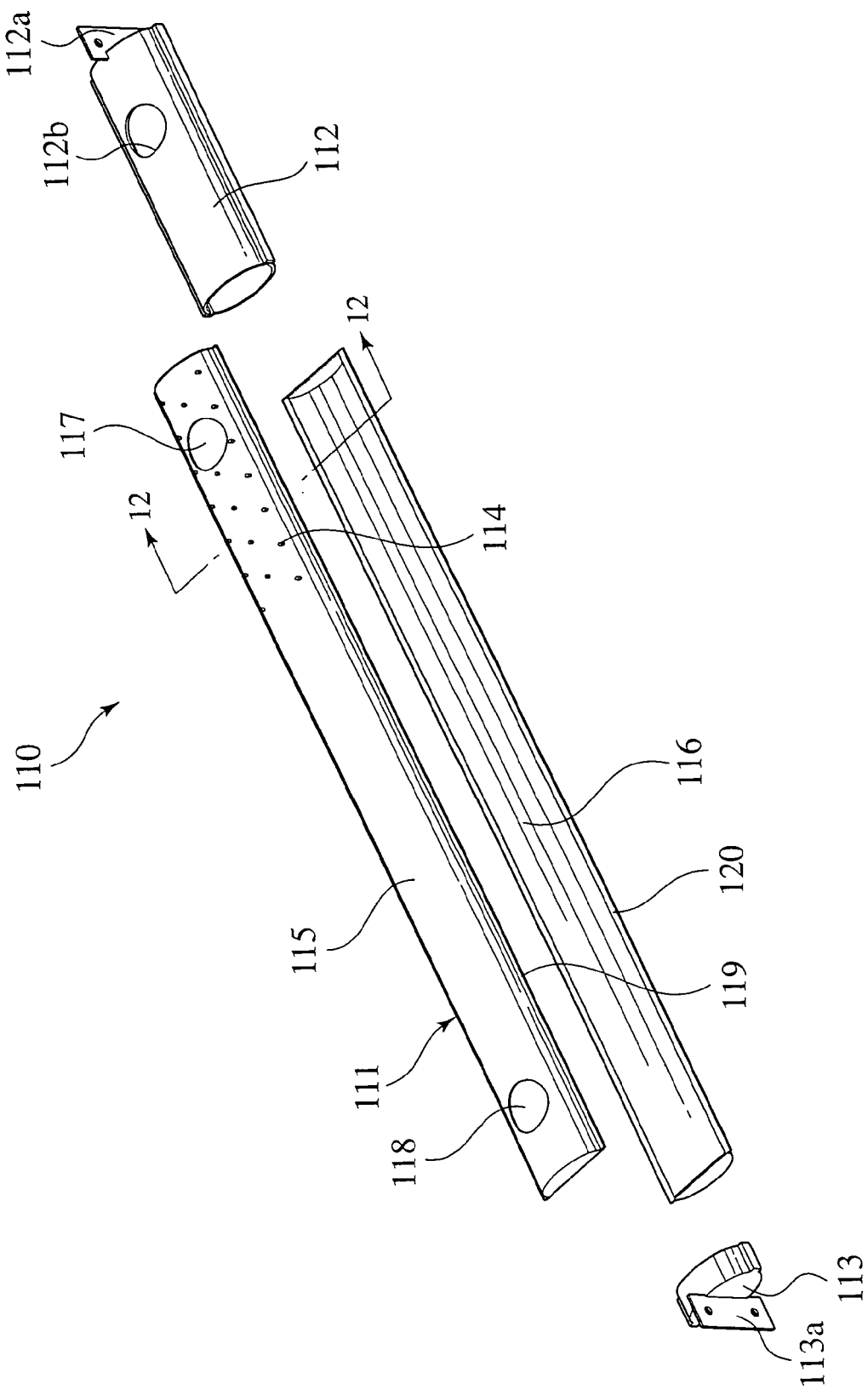
FIG. 11 is a perspective view of the cross member of FIG. 9 in its further exploded condition.

FIG. 11 is a perspective view showing the base frame 111 in its exploded condition. As shown in this figure, the base frame 111 is separated up and down by two half members 115, 116 made of synthetic resin. The upper half member 115 is provided with the above holes 117, 118 on both sides in the axial direction. The upper half member 115 has a pair of parallel flanges 119 formed to extend in the axial direction. Similarly, the lower half member 116 has a pair of parallel flanges 120 formed to extend in the axial direction. In assembling, these flanges 119, 120 of the half member 115, 116 are arranged to butt each other and further welded each other in vibrations. In this way, the base frame 111 is completed while defining a hollow part inside.

As mentioned before, the bosses 114 are formed on the outer surface of the upper half member 115. Repeatedly, these bosses 114 are formed to extend in the vertical direction to facilitate removal of molding dies from the molded member 115.

On the other hand, the reinforcing frame part 112 is provided with an attachment part 112a to be fixed to the lower part of the front pillar on the driver's seat side. Again, the reinforcing frame part 112 has the hole 112b formed to correspond to the hole 117 of the base frame 111.

Next, the manufacturing procedure of the above-constructed cross member 110 will be described below.

Figure 13:
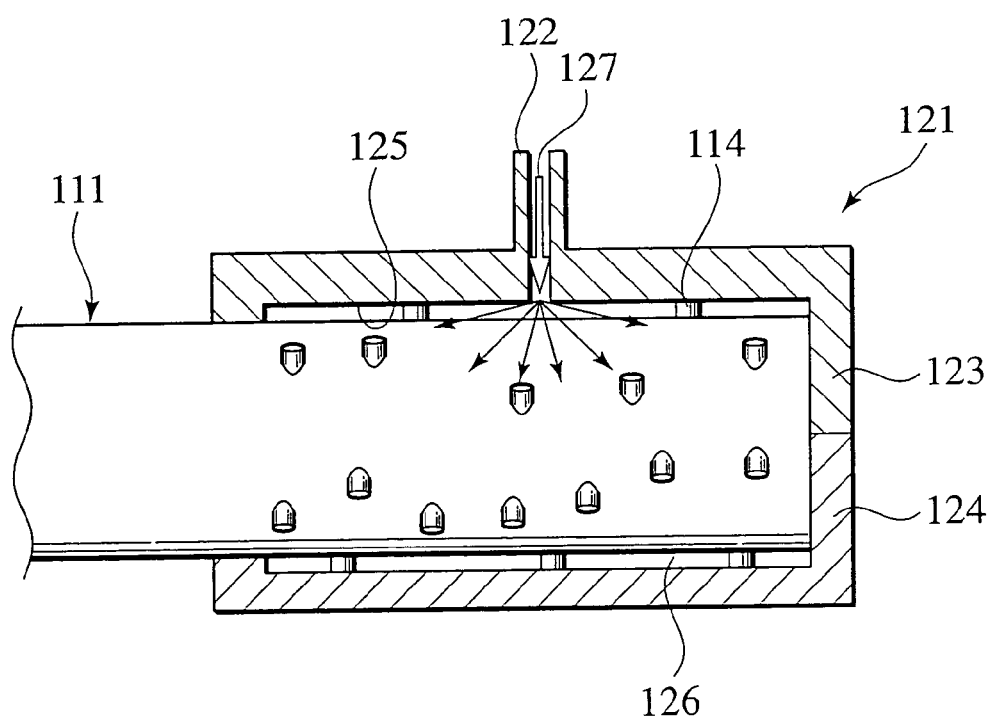
FIG. 13 is a sectional view of the interior of a die assembly, showing the molding state of the cross member in accordance with the first embodiment of the present invention.

FIG. 13 is a sectional view showing the base frame 111 and the interior of a molding die 121 accommodating the base frame 111 therein. The molding die 121 comprises an upper die 123 having its upper surface provided with a gate port 122 and a lower die 124 to be disposed below the upper die 123. As shown in FIG. 13, when the molding die 121 is in its closed condition while accommodating the base frame 111 therein, its part (on the driver's seat side) is accommodated in the molding die 121, while the other part of the frame 111 is arranged to project from the molding die 121. Again noted that the interior of the base frame 111 is shaped to be hollow including the frame's part accommodated in the molding die 121. In the molding die 121, respective tips of the bosses 114 are brought into contact with an inner surface 125 of the die 121. That is, there is defined a cavity 126 between the inner surface 125 of the molding die 121 and the base frame 111. The height of the cavity 126 is substantially equal to that of the boss 114 and also the thickness of the reinforcing frame part 112.

Figure 14:
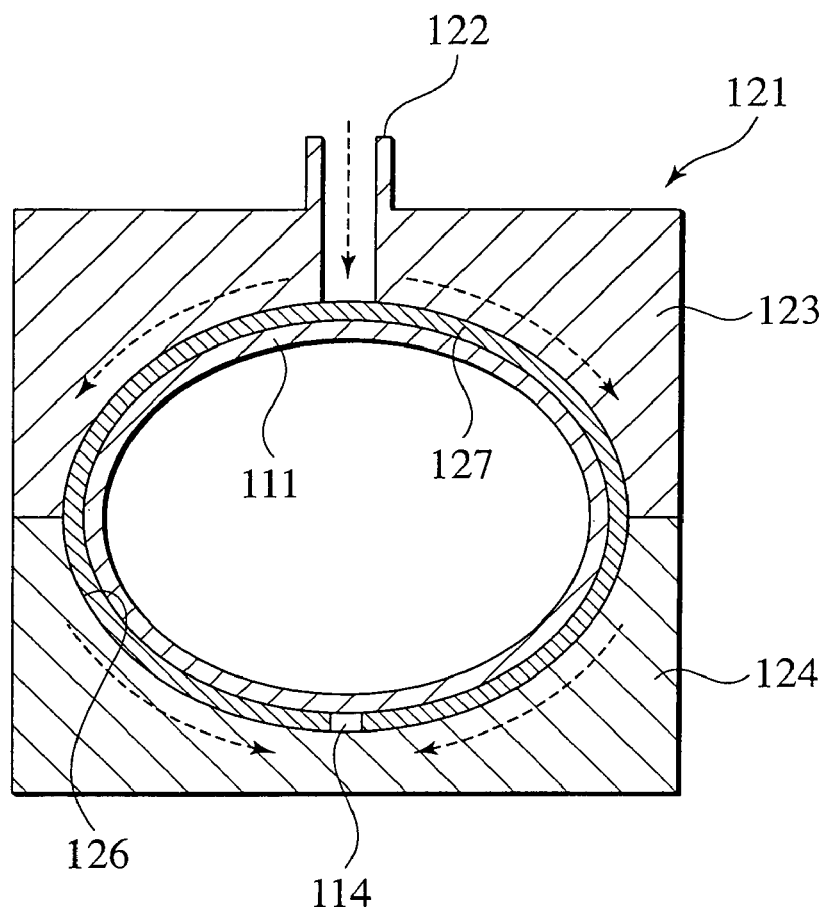
FIG. 14 is another sectional view of the interior of the die assembly, showing the molding state of the cross member in accordance with the first embodiment of the present invention.
Figure 15:
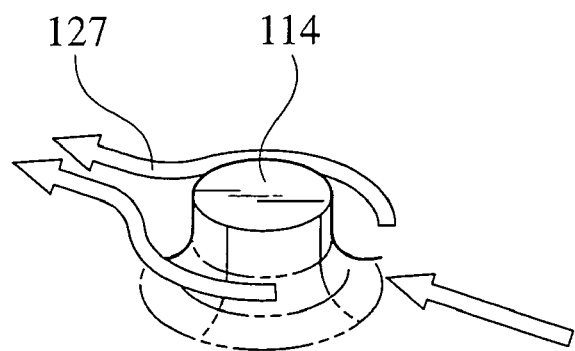
FIG. 15 is a perspective view showing the flow of molten resin in the vicinity of a boss of the base frame.

When producing the reinforcing frame part 112, it is carried out to inpour molten resin 127, which has been reinforced by mixing glass fiber or carbon fiber, into the molding die 121 through the gate port 122. As a result, as shown in FIG. 14, the molten resin 127 flows from the upper side of the cavity 126 to the lower side, so that the cavity 126 is filled up with the molten resin 127. Further, as shown in FIG. 15, since each boss 114 is in the form of a general column, the molten resin 127 flows while getting around the periphery of the boss 114 with reduced flowing resistance.

According to the cross member 110 of the second embodiment, as the bosses 114, which have substantially the same height, come into contact with the inner surface 125 of the molding die 121, there is no possibility that the base frame 111 moves in the diametral direction during the inpour of the molten resin 127 into the molding die 121. Therefore, it is possible to provide the reinforcing frame part 112 with a substantial constant thickness in the circumferential direction.

Additionally, owing to the provision of the bosses 114 of plural number, the resultant reinforcing frame part 112 is firmly engaged with the base frame 111 through the bosses 114. Therefore, it is possible to enhance both torsion rigidity and flexural rigidity of the base frame 111 against the reinforcing frame part 112. Again, as the bosses 114 are shaped to be substantially columnar, the flowability of the molten resin 127 is not greatly influenced, thereby allowing the molten resin 127 to spread effectively through the cavity 126 in the molding die 121. However, the profile of the boss 114, is not limited to the shown substantially columnar structure. Rather, the profile must only prevent an increase in the flowing resistance of the molten resin 127. Accordingly, the boss 114 may be shaped to be a regular polygon in section.

According to the second embodiment, as the reinforcing frame part 112 is provided to reinforce the base frame 111, it is possible to improve the mechanical strength of the steering member (on the driver's seat side) requiring both bearing rigidity and function as a duct. Additionally, although reinforced portion 112 is no more than part of the base frame 111 (and may be made of fiber reinforced resin more advantageous in strength than the resin forming the base frame 111), it is possible to limit an increase in the manufacturing cost of the cross member 110 that might otherwise result due to its increased weight and material.

Further, as the bosses 114 on the base frame 111 are engaged with the inner surface of the reinforcing frame part 112, it is possible to improve the joining strength between the base frame 111 and the reinforcing frame part 112 through the bosses 114. In addition, the bosses 114 further serve to enhance both torsion rigidity and flexure rigidity of the whole cross member 110.

3rd. Embodiment

Next, the third embodiment of the present invention will hereafter be described. Note, in the third embodiment, elements identical to those elements in the second embodiment will be indicated with the same reference numerals and, therefore, their overlapping descriptions are omitted.

Figure 16:
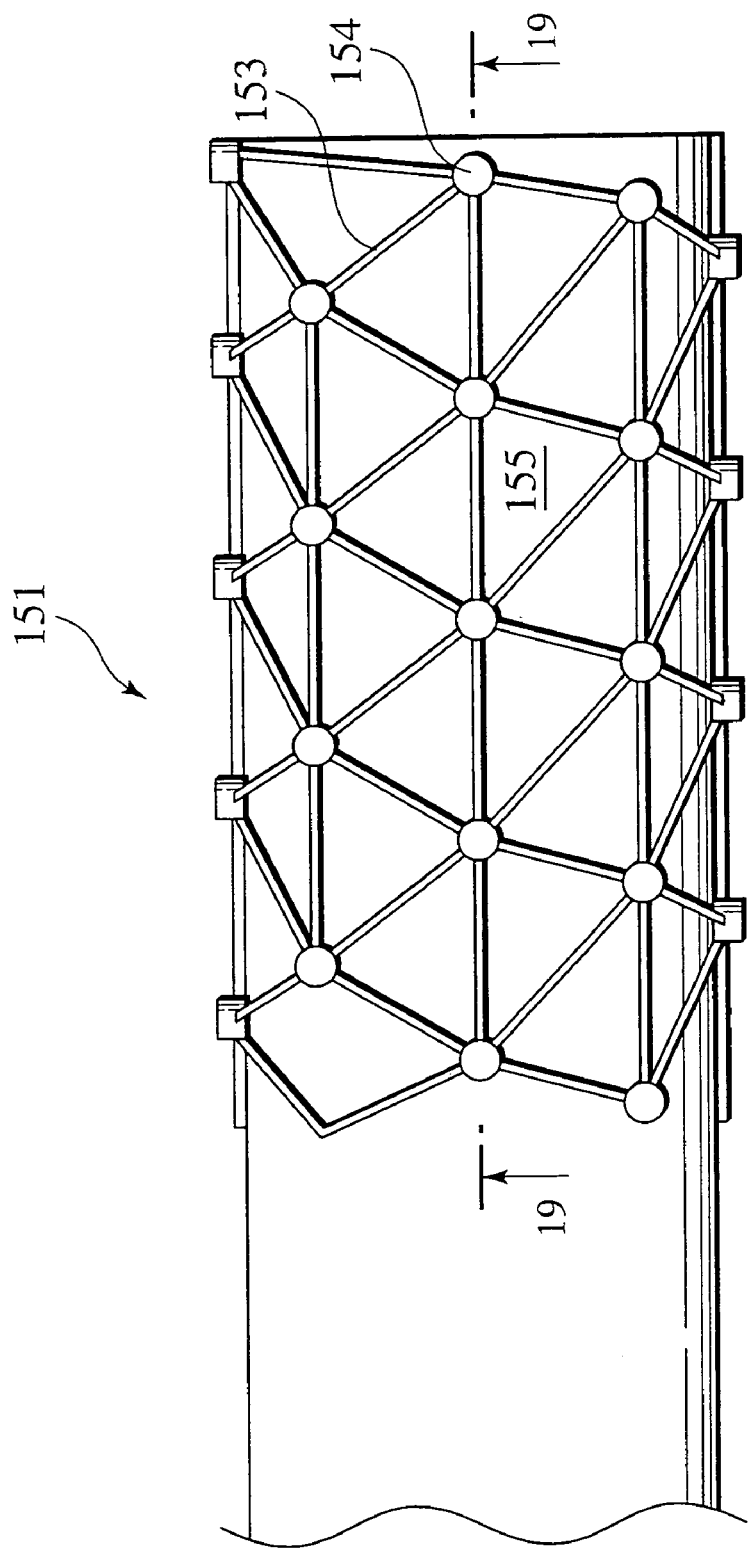
FIG. 16 is a perspective view showing the end of the base frame in accordance with a third embodiment of the present invention.
Figure 17:
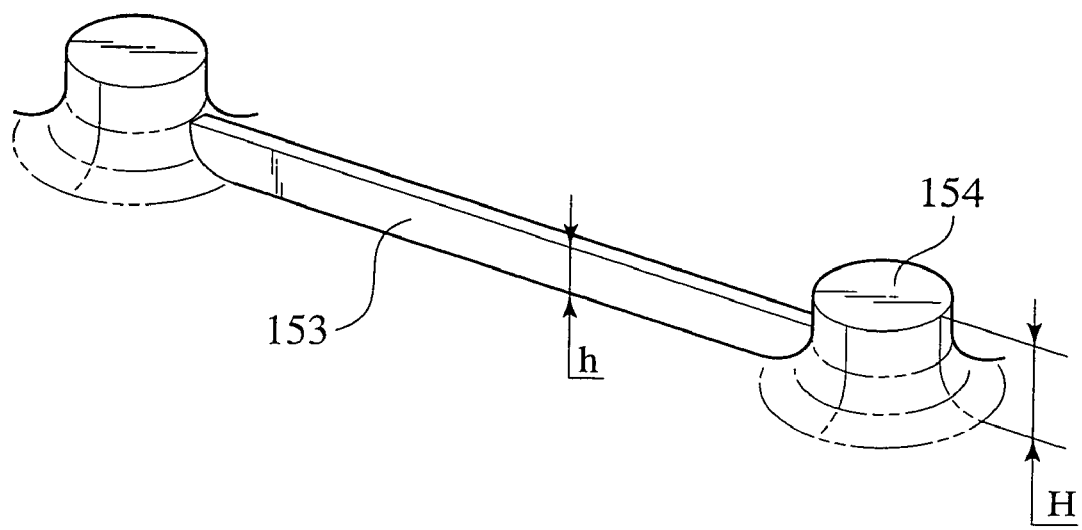
FIG. 17 is a perspective view showing the vicinity of the base frame in accordance with the second embodiment of the present invention.

According to the third embodiment, as shown in FIG. 16, a base frame 151 is provided, on its outer surface, with bosses 154 and ribs 153 connecting the bosses 154 with each other. Each rib 153 is arranged so as to connect the adjoining bosses 154, 154 with each other. A plurality of triangular areas 155 are defined by these ribs 153. As shown in FIG. 17, the rib 153 have a height that is lower than the boss 154. In detail, the former height is half the height of the latter.

Figure 18:
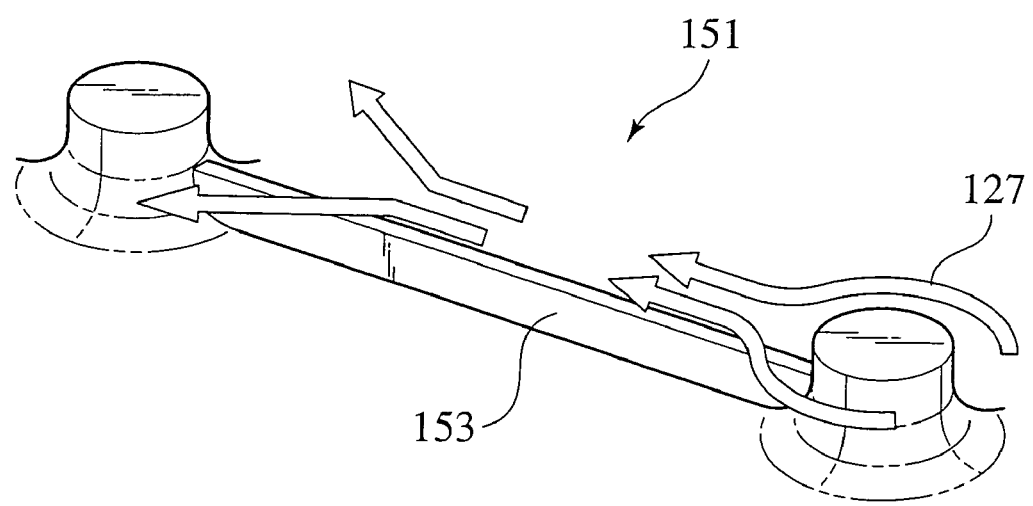
FIG. 18 is a perspective view showing the flow of molten resin in the vicinity of the boss of the base frame of the second embodiment of the present invention.

FIG. 18 is a perspective view showing the flow of the molten resin 127 outside the base flame 151 of the third embodiment. From this figure, it will be understood that the molten resin 127 supplied into the molding die 121 through the gate port 122 flows along the rib 153 and also surmounts the rib 153.

Figure 19:
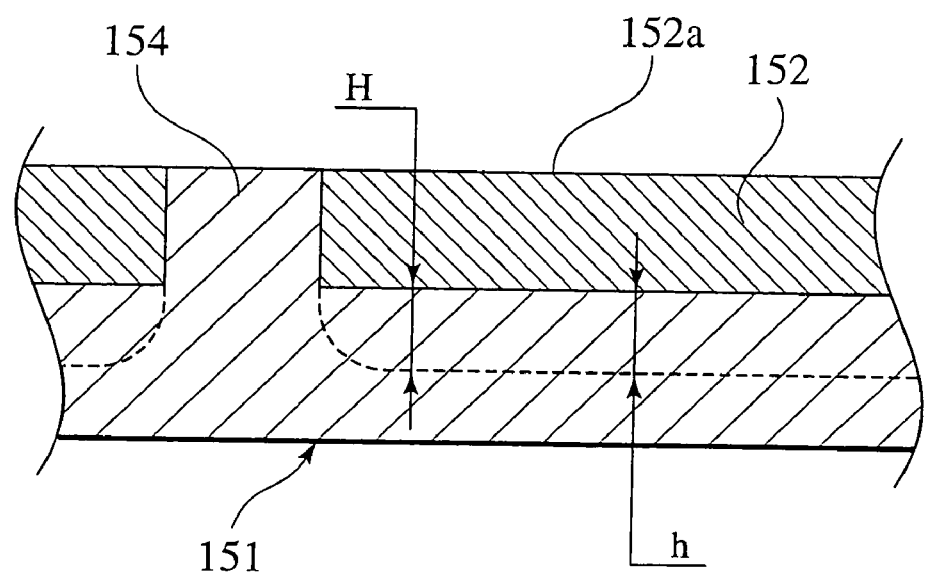
FIG. 19 is a sectional view taken along a line 19-19 of FIG. 16.

As shown in FIG. 19, after the molten resin 127 has gone solid, the reinforcing frame part 152 is formed outside the base frame 151. In the reinforcing frame part 152, its outer surface is level with the tip of the boss 154.

Figure 20:
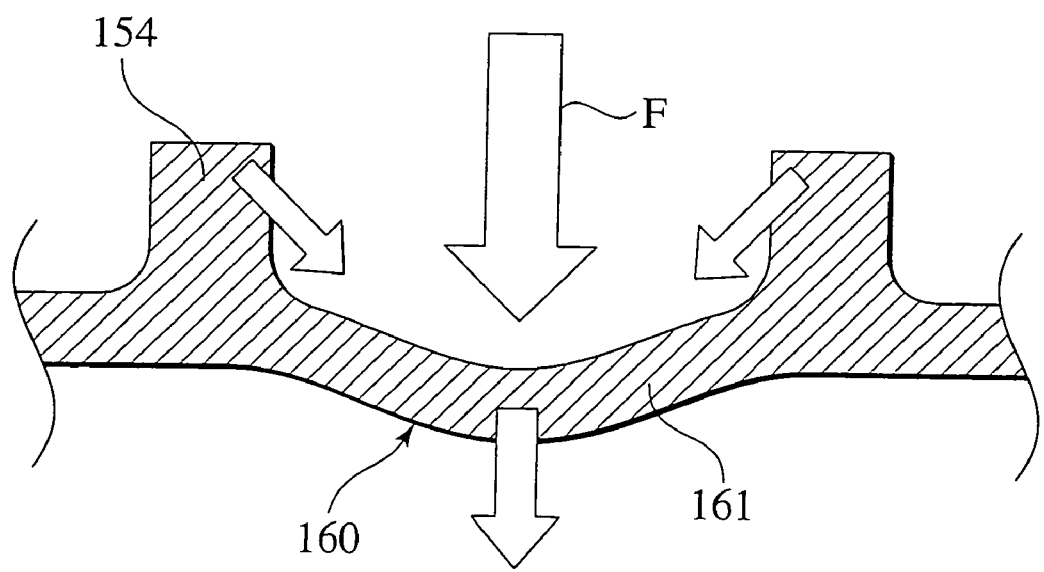
FIG. 20 is a sectional view of the base frame when injecting molten resin to the circumference of the base frame having no rib.
Figure 21:
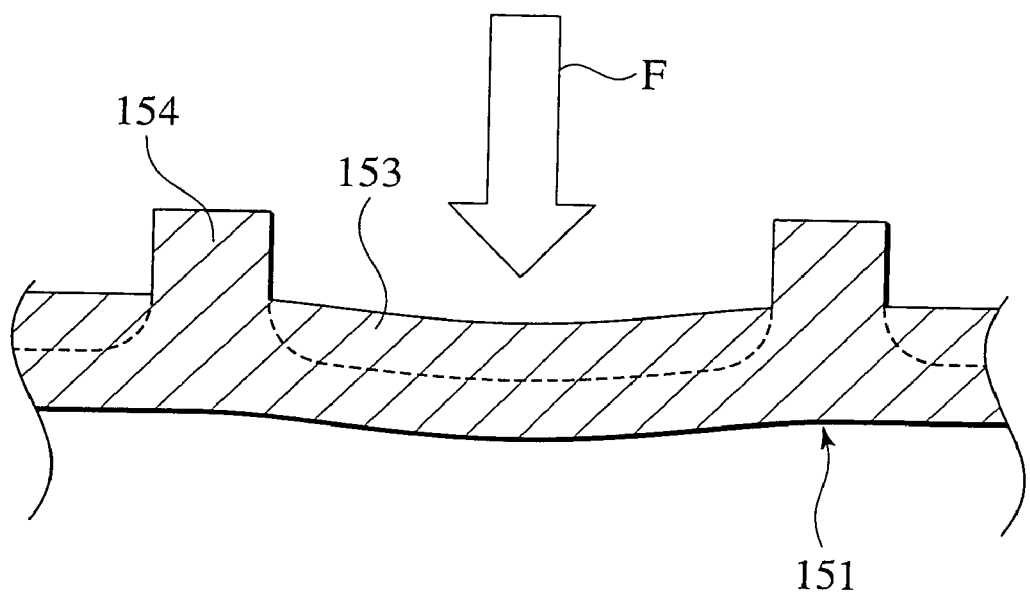
FIG. 21 is a sectional view of the base frame when injecting molten resin to the circumference of the base frame having ribs.

As a reference shown in FIG. 20, it is noted that if the molten resin is poured outside a base frame 160 having no rib, then there arises the possibility that a thin sidewall 161 of the base frame 160 may collapse inwardly by a molding pressure F applied on the frame 160. However, as shown in FIG. 21, as the base frame 151 of this embodiment is provided with the ribs 153, there is no possibility of collapse in the sidewall of the base frame 151 due to its improved rigidity against the molding pressure F.

In conclusion, owing to the provision of the bosses 154 and the ribs 153 on the periphery of the base frame 151 in accordance with the third embodiment of the invention, the frame 151 is enhanced in both torsion rigidity and flexure rigidity, whereby the strength of the whole cross member can be improved furthermore.

Finally, it will be understood by those skilled in the art that the foregoing descriptions are nothing but some embodiments of the disclosed cross member for a vehicle. Besides these embodiments, various changes and modifications may be made to the present invention without departing from the scope of the invention.

This application claims priority from Japanese Patent Application 2002-319809, filed Nov. 1, 2002, and Japanese Patent Application 2002-368060, filed Dec. 19, 2002, both of which are incorporated herein by reference in their entirety.

What is claimed is:

1. A manufacturing method of a cross member, which is configured to extend in a width direction of a vehicle body and which is configured to have both ends connected to side framework structures of the vehicle body, the method comprising the steps of:

forming, from a material, a base frame extending in the width direction of the vehicle body by means of resinous molding, the base frame being formed to have a substantially circular or oval cross-section;

forming a plurality of bosses on an outer circumferential surface of the base frame in different positions in an axial direction of the base frame within a limited range of the base frame and arranged so that each of the bosses is located in a different cross-section perpendicular to the axial direction of the base frame;

forming a plurality of ribs on the outer circumferential surface of the base frame wherein each of the ribs is arranged so as to connect each of the bosses, and each of the ribs has a height lower than the bosses;

accommodating the limited range of the base frame in a molding die wherein the bosses each having a height capable of contacting with the inner surface of the molding die when the molding die is closed; and forming reinforcing frame parts on the limited range of the base frame by means of insert-molding, by filling up a cavity between the outer circumferential surface of the base frame and the inner surface of the molding die with molten resin which is resinous material belonging to a same material system as the material of the base frame in a manner such that the molten resin flows between each of the plurality of bosses in the cavity and such that the molten resin flows along each of the plurality of ribs and the molten resin surmounts each of the ribs, thereby forming reinforcing frame parts integral with the base frame, the reinforcing frame parts being molded to have substantially circular or oval cross-sections whereby the base frame is covered with the reinforcing frame parts.

2. The manufacturing method of claim 1, wherein the base frame is produced by injection molding.

3. The manufacturing method of claim 1, wherein the reinforcing frame parts are produced by means of insert-molding while inserting part of the base frame into a molding die.

4. The manufacturing method of claim 1, wherein the material of the reinforcing frame parts is higher in rigidity than the material of the base frame.

5. The manufacturing method of claim 1, wherein the base frame and the reinforcing frame parts are made from same engineering material or plural engineering plastic materials belonging to the same material system.

6. The manufacturing method of claim 5, wherein the base frame is made from resinous material containing a reinforcing material.

7. The manufacturing method of claim 5, wherein the reinforcing frame parts are made from resinous material containing a reinforcing material.

8. The manufacturing method of claim 1, wherein the base frame has a hollow part to serve as a part of an air conditioning duct.

9. The manufacturing method of claim 6, wherein the reinforcing material contains at least one of glass fiber, talc, carbon fiber, Kevlar fiber, ceramic fiber, metal fiber and natural fiber.

10. The manufacturing method of claim 6, wherein the reinforcing material contains glass fiber of 15 to 50% content, of which flexural elasticity is more than 10 GPa at absolute dry and 5 GPa at wet.

11. The manufacturing method of claim 7, wherein the reinforcing material contains at least one of glass fiber, talc, carbon fiber, Keviar fiber, ceramic fiber, metal fiber and natural fiber.

12. The manufacturing method of claim 7, wherein the reinforcing material contains glass fiber of 30% or more content, of which flexural elasticity is more than 25 GPa at absolute dry and 10 GPa at wet.

13. The manufacturing method of claim 3, wherein the reinforcing frame parts are produced by means of injection molding while inserting a part of the base frame.

14. The manufacturing method of claim 1, wherein the bosses are shaped to be substantially columnar.

* * * * *